Patented Dec. 4, 1951

2,577,387

UNITED STATES PATENT OFFICE 2,577,387

QUATERNARY PHENANTHRIDINIUM COMPOUNDS

Leslie Percy Walls and Frederick Charles Copp, London, England, assignors to Burroughs Wellcome & Co. (U. S. A.) Inc., Tuckahoe, N. Y., a corporation of New York No Drawing. Application November 26, 1948, Serial No. 62,248. In Great Britain February 4, 1948

4 Claims. (Cl. 260—286)

This invention relates to the preparation and manufacture of certain new quaternary salts of the phenanthridine series.

It is known that certain quaternary phenanthridine compounds which contain at least one amino group in the diphenyl portion of the phenanthridine molecule are active in infections due to the trypanosome, *Trypanosoma congolense,* and that really high trypanocidal activity has previously been found only in those compounds which contain at least two amino groups (Walls, Browning, Calver and Leckie, Journal of the Chemical Society, 1945, page 294, and 1947, page 67). Furthermore, in those compounds hitherto described in which no amino group is present in the diphenyl portion of the molecule, for example 9 - p - aminophenylphenanthridine methochloride, little or no trypanocidal activity has been found.

We have now prepared and examined quaternary salts of the general Formula I, which carry an alkoxy group containing from 1 to 7 carbon atoms in the diphenyl portion of the molecule, that is to say on the ring A or the ring B, and which carry in the 9-position an aryl or aralkyl group (R) containing one or more nitro- or amino-, substituents. X is an anion such as methosulphate, chloride or iodide. Several of these compounds have been found to possess powerful antiparasitic properties and, in particular, a powerful trypanocidal action in *T. congolense* infections (a result which could not be foreseen), combined with an acute toxicity which is lower than that of many of the diamino analogues previously described.

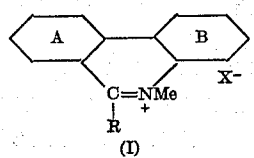

(I)

In accordance with our invention these quaternary salts are prepared by treating amides of the general Formula II (where $R_1$ is a nitro-aryl or carbalkoxyamino-aryl or -aralkyl group and ring A or B carries an alkoxyl group containing from 1 to 7 carbon atoms) with a pentavalent compound of phosphorus such as phosphorus oxychloride; ring-closure to the appropriate phenanthridines of the general Formula III then takes place.

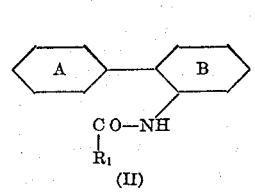 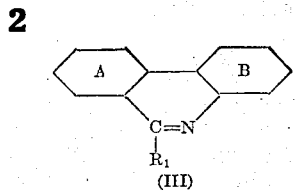

Alternatively, in accordance with our invention these same compounds (III) may be prepared by diazotization of the corresponding amino compounds, followed by alkylation of the hydroxy compounds so obtained.

The desired quaternary compounds (I) are then formed, in accordance with our invention, by treating the substances (III) (however obtained) with a suitable quaternising agent; the corresponding amino compounds can then be produced (in accordance with our invention) by suitable reduction of the nitro-compounds.

Desirably, in accordance with our invention, the alkoxy group is in the 7-position and advantageously it is an ethoxy or propoxy group, such compounds having been found experimentally to possess the highest therapeutic activity.

The process of our invention is illustrated but not limited by the following examples; the preparation of intermediate compounds, such as the amides (II), is described where necessary.

Example 1

A solution of 2-amino-4'-methoxydiphenyl (15 grams) in chloroform (120 millilitres) at room temperature, is stirred with powdered anhydrous sodium carbonate (10 g.) and treated with p-nitrobenzoyl chloride (15 g.) in small portions. When addition is complete, the mixture is stirred for a further 30 minutes, heated to boiling for 5 minutes and then filtered. The residue left after evaporation of the chloroform from the filtrate crystallises from alcohol or benzene in yellowish prisms of 2 - p-nitrobenzamido-4'-methoxydiphenyl, melting point 164° centigrade. Yield 26 g. This product is suspended in phosphorus oxychloride (27 millilitres), the mixture refluxed for 3 hours and decomposed with ice. The solid product is collected and purified by grinding with excess concentrated hydrochloric acid and chloroform and filtering; the residue consists of the hydrochloride of the phenanthridine compound while the chloroform filtrate yields unchanged starting material (5 g.) on evaporation.

The phenanthridine hydrochloride is treated with excess ammonia in alcohol to liberate 7-methoxy-9-p-nitrophenylphenanthridine, which crystallises from benzene as lemon-coloured plates, of melting point 233–234° centigrade (yield 18 g.).

Acid-free dimethyl sulphate (7 millilitres) is added to a solution of this product in dry nitrobenzene (70 millilitres) which has been preheated to 150° centigrade. After 20 minutes at 150° centigrade, the solution is cooled and 7-methoxy-9-p-nitrophenylphenanthridine methosulphate crystallises. The corresponding methochloride is obtained by dissolving this salt in a minimum of hot water, and adding excess concentrated hydrochloric acid; it separates in yellow prismatic plates, melting point 230–232° centigrade (yield 19.2 grams).

*Example 2*

7-methoxy-9-p-nitrophenylphenanthridine methochloride (20 grams) (prepared as described in Example 1) is suspended in water (200 millilitres) and heated under reflux for 20 minutes with iron filings (20 grams) and a drop of hydrochloric acid (2 normal) or ferric chloride solution. The mixture is filtered hot, when orange-coloured plates rapidly separate from the filtrate. This product, 7-methoxy-9-p-aminophenylphenanthridine methochloride, deepens to a deep red on drying (yield 14.8 grams), melting point 253–254° centigrade.

*Example 3*

2-nitro-4'-hydroxydiphenyl (30 grams) is dissolved in aqueous caustic soda (180 millilitres, strength equal to twice normal) and the resulting solution stirred on a steam-bath as diethyl sulphate (25 grams) is gradually added. After 2 hours the mixture is cooled and the precipitated oil dissolved in ether; the ether solution is washed with dilute caustic soda and dried over anhydrous sodium sulphate. The residue left on evaporation of the ether, 2-nitro-4'-ethoxydiphenyl, was treated with light petroleum (of boiling point 40–60° centigrade), when it formed yellow prisms, melting point 51° centigrade (yield 26 grams). This product is reduced in alcohol (200 millilitres) over a palladium-charcoal catalyst (5 grams), at a temperature of 70° centigrade and a pressure of 50 atmospheres of hydrogen. When absorption is complete the catalyst is filtered, the alcohol evaporated under reduced pressure and the residue distilled in vacuo. 2-amino-4'-ethoxydiphenyl is obtained as an oil, boiling at 130–137° centigrade (at a pressure of 0.01 millimetre of mercury). It is subsequently solidified to a colourless solid, melting point 56° centigrade (16.5 grams).

By processes analogous to those described in Example 1 this is now treated with p-nitrobenzoyl chloride to yield 2-p-nitrobenzamido-4'-ethoxydiphenyl, melting point 147° centigrade, which is in turn converted into 7-ethoxy-9-p-nitrophenylphenanthridine, melting point 237° C. Treatment with excess of dimethyl sulphate in nitrobenzene at 150° centigrade then gives the methosulphate, from which 7-ethoxy-9-p-nitrophenylphenanthridine methochloride is obtained by treatment with excess hydrochloric acid. It crystallises from water in yellow needles, melting point 233° centigrade.

7-ethoxy-9-p-aminophenylphenanthridine methochloride is obtained by reduction of the nitro-compound with iron powder in slightly acidulated water as described in Example 2. It crystallises from alcohol in bright red needles, melting point 225° centigrade.

*Example 4*

The conversion of 6-amino-9-p-nitrophenylphenanthridine into 6-hydroxy-9-p-nitrophenylphenanthridine has already been described (Caldwell and Walls, Journal of the Chemical Society, 1948, page 188) but we find that 7-hydroxy-9-p-nitrophenylphenanthridine is more conveniently prepared by demethylation of 7-methoxy-9-p-nitrophenylphenanthridine. This is best effected by treating the above methoxyl compound with 10 parts of concentrated hydrochloric acid for 3 hours at 140° centigrade in a sealed tube. 7-hydroxy-9-p-nitrophenylphenanthridine is obtained as a crystalline solid, melting point 275° centigrade.

This hydroxy compound (4.4 grams) is dissolved in aqueous caustic soda (6.8 millilitres; strength equal to 2 normal), the resulting solution heated in an oil-bath at 110° centigrade and stirred vigorously whilst n-propyl iodide (2 millilitres) is added. After 3 hours a further quantity of n-propyl iodide (1 millilitre) is added and the mixture heated for a further 4 hours. After cooling, the crystalline product is filtered, washed with water and recrystallised from alcohol. 7-n-propoxy-9-p-nitrophenylphenanthridine is obtained as a pale yellow solid, melting point 167° centigrade.

By processes analogous to those described in Example 1, this phenanthridine is converted into 7-n-propoxy-9-p-nitrophenyl-10-methylphenanthridinium chloride, melting point 220° centigrade. Reduction can then be effected by iron powder (as in Example 2) to give 7-n-propoxy-9-p-aminophenyl-10-methylphenanthridinium chloride, melting point 215° centigrade.

What we claim is:

1. Quaternary phenanthridinium salts of the formula

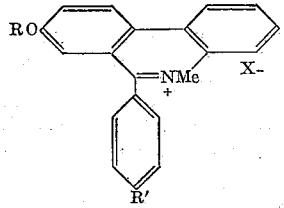

wherein R is a radical selected from the class consisting of methyl, ethyl and normal propyl radicals, R' is a radical selected from the class consisting of the amino and nitro radicals and X is an anion.

2. As a new compound 7-n-propoxy-9-p-aminophenyl-10-methyl phenanthridinium salts.

3. As a new compound 7-ethoxy-9-p-aminophenyl-10-methyl phenanthridinium salts.

4. As a new compound 7-ethoxy-9-p-nitrophenyl-10-methyl phenanthridinium salts.

LESLIE PERCY WALLS.
FREDERICK CHARLES COPP.

REFERENCES CITED

The following references are of record in the file of this patent:

UNITED STATES PATENTS

| Number | Name | Date |
|---|---|---|
| 2,397,391 | Walls | Mar. 26, 1946 |
| 2,437,869 | Walls | Mar. 16, 1948 |

OTHER REFERENCES

Walls: J. Chem. Soc. (London), 1935, pp. 1405–1410.